United States Patent
Haas et al.

(12)

(10) Patent No.: US 7,924,867 B2
(45) Date of Patent: Apr. 12, 2011

(54) COMMUNICATIONS NETWORK USING RESERVATION INDICATOR

(75) Inventors: Harald Haas, Bremen (DE); Peter E. Omiyi, Bremen (DE)

(73) Assignee: NTT DoCoMo, Inc., Tokyo (JP)

( * ) Notice: Subject to any disclaimer, the term of this patent is extended or adjusted under 35 U.S.C. 154(b) by 1005 days.

(21) Appl. No.: 10/576,980

(22) PCT Filed: Oct. 20, 2004

(86) PCT No.: PCT/EP2004/011840
§ 371 (c)(1),
(2), (4) Date: Jan. 25, 2007

(87) PCT Pub. No.: WO2005/041494
PCT Pub. Date: May 6, 2005

(65) Prior Publication Data
US 2007/0274280 A1    Nov. 29, 2007

(30) Foreign Application Priority Data

Oct. 24, 2003  (EP) ..................................... 03024367

(51) Int. Cl.
*H04L 12/413* (2006.01)
(52) U.S. Cl. ........ 370/445; 370/446; 370/447; 370/448; 455/69; 455/434
(58) Field of Classification Search ................... 370/445, 370/446, 447, 448; 455/69, 434
See application file for complete search history.

(56) References Cited

U.S. PATENT DOCUMENTS
6,400,698 B1    6/2002  Shaheen
(Continued)

FOREIGN PATENT DOCUMENTS
JP    2002-118875 A    4/2002
(Continued)

OTHER PUBLICATIONS

English translation of Office Action dated Feb. 23, 2010 issued in JP2006-536033. Office Action dated Sep. 6, 2010 for JP2006-536033 and its English translation.

*Primary Examiner* — Nick Corsaro
*Assistant Examiner* — Amanuel Lebassi
(74) *Attorney, Agent, or Firm* — Nutter McClennan & Fish LLP; John J. Penny, Jr.

(57) ABSTRACT

The present invention relates to a communications network including transmitting stations and receiving stations for transmitting and receiving signals, the transmitting stations being adapted for transmitting a data signal as a series of data packets, wherein a data packet is scheduled to be transmitted by use of an available transmission resource, and receiving stations for transmitting a reservation indicator for reception by transmitting stations. In order to avoid transmission conflicts, in particular inter-cell conflicts in a cellular TDMA communications network, it is proposed that a reservation indicator transmitted by a receiving station carries a first reservation indicator value to indicate that a data transmission resource has been reserved by the receiving station for reception of the next data packet of a data signal from a transmitting station transmitting said data signal or a second reservation indicator value to indicate that a data transmission resource has not been reserved by the receiving station for reception of the next data packet from the transmitting station or that the last data packet has not been received with acceptable interference from the transmitting station, and wherein transmitting stations receiving a reservation indicator carrying a first reservation indicator value transmitted from a receiving station to which no data signal has been transmitted by them will not transmit a data packet by use of the reserved transmission resource.

20 Claims, 13 Drawing Sheets

U.S. PATENT DOCUMENTS

| | | | |
|---|---|---|---|
| 2001/0033559 A1* | 10/2001 | Masui et al. | 370/335 |
| 2002/0041584 A1 | 4/2002 | Sashihara | |
| 2002/0080768 A1 | 6/2002 | Garcia-Luna-Aceves et al. | |
| 2002/0163933 A1* | 11/2002 | Benveniste | 370/465 |
| 2003/0002449 A1 | 1/2003 | Rittle et al. | |

FOREIGN PATENT DOCUMENTS

| | | |
|---|---|---|
| JP | 2002-217913 A | 8/2002 |
| WO | 01/26292 A2 | 4/2001 |
| WO | 02/28001 | 4/2002 |
| WO | 02/082751 A2 | 10/2002 |

* cited by examiner

COMMUNICATIONS NETWORK USING RESERVATION INDICATOR

BACKGROUND OF THE INVENTION

The present invention relates to a communications network comprising a plurality of transmitting stations and receiving stations for transmitting and receiving signals, said transmitting stations being adapted for transmitting a data signal as a series of data packets, wherein a data packet is scheduled to be transmitted by use of an available transmission resource, and said receiving stations being adapted for transmitting a reservation indicator for reception by transmitting stations. The invention relates further to a corresponding communications method, to a transmitting station and to a receiving station for use in such a communications network.

The growth of wireless internet, and text, picture and video messaging services suggest that 3G and next-generation wireless communications, must adequately support a plurality of packet data services, with bursty traffic characteristics, heterogeneous Quality of Service (QoS) requirements, and traffic load asymmetry both spatially and between the uplink (UL) and downlink (DL) in cellular mobile communications. In order to provide the required QoS support for real-time services and dynamically schedule the bursty traffic centralised intra-cell scheduling is considered the best strategy. Also, to achieve a high trunking and spectral efficiency, 100% frequency re-use is also considered essential. However, centralised intra-cell scheduling, although nearly ideal in the absence of inter-cell interference, fails in the presence of uncontrolled inter-cell interference in a cellular mobile environment. This situation is exacerbated in TDMA systems, which have a higher SIR requirement than CDMA systems, and even worse still in TDMA TDD systems, where there is the potential for significant intercell interference from mobile-station (MS)-to-mobile-station interference.

Coordinating transmissions in neighbouring cells, in a centralised manner, is one way that has been proposed to combat this problem, but it involves significant overhead over the air-interface. In particular, information of the link-gains between each MS in a cell to all MSs and BSs (base stations) in neighbouring cells, needs to be signalled to the network to mitigate MS-to-MS interference (in TDD) and MS-to-BS/BS-to-MS interference (in both TDD and FDD), respectively. This overhead could compromise capacity.

Another approach that has been proposed in H. Haas et al. "Interference diversity through random time slot opposing (RTO) in a cellular TDD system", Proc. IEEE VTC 2002-Fall, Vol. 3, 24-28 Sep. 2002, pp. 1384-1388 is a 'passive' distributed strategy involving slow dynamic channel allocation, such as frequency hopping and slot hopping, does not require any overhead and which averages out the intercell interference. However, this approach cannot react to mitigate sudden increases in interference and therefore its performance is compromised.

US 2002/0041584 A1 discloses a method allowing effective avoid asynchronous interference that occurs in the area where different cells overlap. In a TDMA system, a base station desires of using a channel transmit an interference check signal at a slot corresponding to each of transmission and reception timings on the channel to check whether asynchronous interference occurs on the channel. A mobile station determines whether asynchronous interference occurs on the channel, based on a plurality of error packet reception results on the channel. When asynchronous interference occurs, the mobile station transmits an interference notification signal to the base station. The base station, when receiving an error packet or the interference notification signal, determines that asynchronous interference occurs, and selects another channel to avoid asynchronous interference.

U.S. Pat. No. 6,400,698 B1 discloses a state machine and random reserve access protocol for TDMA packet data mobile stations.

SUMMARY OF THE INVENTION

It is an object of the present invention to provide a communications system and method which provide a solution to the problem of uncontrolled interference, in particular inter-cell interference in cellular communications systems, which is efficient but does not require much overhead. Further, an appropriate transmitting station and receiving station shall be provided.

This object is achieved according to the present invention by a communications system wherein a reservation indicator transmitted by a receiving station carries a first reservation indicator value to indicate that a data transmission resource has been reserved by said receiving station for reception of the next data packet of a data signal from a transmitting station transmitting said data signal or a second reservation indicator value to indicate that a data transmission resource has not been reserved by said receiving station for reception of the next data packet from said transmitting station or that the last data packet has not been received with acceptable interference from said transmitting station, and wherein transmitting stations receiving a reservation indicator carrying a first reservation indicator value transmitted from a receiving station to which no data signal has been transmitted by them will not transmit a data packet by use of the reserved transmission resource.

A corresponding communications method is defined. An appropriate transmitting station according to the invention is defined, an appropriate transmitting station according to the invention is defined. Preferred embodiments are defined in the dependent claims.

The present invention is based on the idea to provide carrier sensing as an active distributed scheduler, which detects interference and reacts in real-time to mitigate this interference. Since it enables to resolve inter-cell conflicts, it can be used with a centralised intra-cell scheduler to provide high performance in a multi-cellular TDD or FDD environment. Also, the distributed nature of proposed scheme allows it to be used in hybrid cellular and ad-hoc communications networks, where it fully coordinates communication in the ad-hoc segment, while only coordinating communication between cells in the cellular segment.

According to the invention a reservation indicator is introduced which is emitted by a receiving station for reception of the transmitting station which has sent a data packet to the receiving station, but also for reception by other transmitting stations located in the surrounding area (i.e. in the reception area) to inform them if a particular data transmission resource has been reserved for communication with a different transmitting station. Based on a received reservation indicator the transmitting station which has sent the data packet to the receiving station then knows if the data packet has been received correctly, i.e. without unacceptable interference caused by transmissions of other stations in the same data transmission resource, and if the same data transmission resource is still reserved for transmission of at least one further data packet. Further, other transmitting stations, which shall be understood as including all stations that are actually transmitting data packets and that are planning to transmit data packets, know based on a received reservation indicator that a particular data transmission resource has been reserved for a different transmitting station so that their own transmission of data packets can be scheduled in a different data transmission resource. Conflicts leading to interferences and data loss during transmission can thus be effectively avoided.

The proposed channel-sensing scheme, when used in a TDMA system, shall be denoted as CSTDMA (Channel Sensing TDMA) and is a "busy-tone" broadcast protocol, "busy-tone" meaning the use of a reservation indicator, which preferably uses TDD instead of FDD to support the additional signalling. The preferred use of TDD in the protocol is compatible with the air-interface and avoids the increase in receiver complexity and wasted bandwidth, associated with the use of FDD to support protocol signalling. The proposed "busy-tone" broadcast approach has the advantage over pure carrier sensing of avoiding the hidden and exposed node problems, which are characteristic of the latter in the wireless environment. In addition, it is better than the RTS/CTS handshaking mechanism in 802.11 wireless LANs, which only combat the hidden node problem. Furthermore, the MAC signalling channel and information channel of the proposed "busy-tone" broadcast approach are physically orthogonal and so they do not mutually interfere, unlike in RTS/CTS handshaking. Also, the proposed "busy-tone" broadcast approach requires less overhead than RTS/CTS handshaking and less stringent turn-around time constraints, which is especially critical in high speed wireless networks.

Preferably, the invention is applied in a TDMA network, which may be a cellular communications network, and ad-hoc communications network or a hybrid cellular/ad-hoc communications network. The data transmission resource will then be either a data time slot and/or a data sub-carrier.

The invention can also be applied in other networks, like CDMA and FDMA networks. In case of CDMA, data codes are used as data transmission resource, instead of, or in addition to data time-slots/sub-carriers. In case of FDMA, data carriers are used as data transmission resource, instead of, or in addition to data time-slots/sub-carriers.

Similarly, for the transmission of the reservation indicator an indicator resource, in particular indicator time slots, indicator sub-carriers, indicator carriers and/or indicator codes, is provided.

In a preferred embodiment the invention is used in TDD (Time Division Duplex) system. In this embodiment each data packet is transmitted in a fixed data time slot within a time frame, wherein indicator time slots are assigned to said data time slots, and wherein said reservation indicator indicates if the associated data time slot has been reserved in the subsequent time frame for transmission of the next data packet by said transmitting station. Preferably, for each data time slot a corresponding indicator time slot which requires much less space, for instance only one bit, is required. Preferably, the indicated time slots are provided at the end of each data time slot so that subsequent data time slots are separated by such indicator time slots.

In an alternative embodiment it is proposed that said data packets are transmitted in a fixed data sub-carrier, wherein an indicator sub-carrier is assigned to said data sub-carrier, and wherein said reservation indicator indicates if the associated data sub-carrier is reserved for transmission of the next data packet by said transmitting station. This embodiment can be implemented in a TDD or FDD (Frequency Division Duplex) system. Thus, no particular reservation indicator time slots are provided between the data time slots, but a separate indicator sub-carrier is provided for transmission of only the reservation indicator. For each receiving station a separate sub-carrier may be provided for the transmission of reservation indicators or, alternatively, reservation indicators of different receiving stations and/or for reception of different transmitting stations may be multiplexed into the same sub-carrier. For instance, for each data time slot a corresponding indicator time slot may be provided in the indicator sub-carrier where the indicator time slot is transmitted simultaneously or delayed with a slight time offset compared to the transmission of the corresponding data time slot. The use of indicator sub-carriers has the advantage over the use of indicator time-slots of potentially less overhead and relaxed transmission/reception turn-around time restrictions.

A simple embodiment of representing the desired information by the reservation indicator is defined. Therein, the presence or absence of the reservation indicator represents two different reservation indicator values and thus two different pieces of information. In a different embodiment, two different reservation indicator values, for instance bit "0" or bit "1", are used. Of course, many different variations of indicating two different kinds of information are possible and can be used here.

In a further embodiment it is proposed that a data transmission resource for the transmission of data packets be selected based on the reservation indicator. More particularly, according to a further embodiment, the transmission of a signal from a transmitting station to receiving station is controlled based on received reservation indicators such that the data packets of the signal are transmitted in a non-reserved data transmission resource. Thus, transmitting stations wanting to transmit a signal can be deterred from transmitting the signal in reserved data transmission resources. Preferably, before transmitting a first data packet of a signal, a transmission station listens to the desired sub-carrier if a reservation indicator indicates that the desired data transmission resource is reserved or not. If a reservation indicator indicates that the desired data transmission resource is reserved, a transmission of the data packet is delayed or a different data transmission resource is selected.

In still a further embodiment it is proposed that a transmitting station stops the transmission of data packets in the reserved data transmission resource upon receipt of a reservation indicator from the receiving station to which the transmission station transmits data packets, if said received reservation indicator carries a reservation indication value indicating that a data transmission resource has not been reserved by said receiving station for reception of the next data packet from said transmitting station and/or that the last data packet has not been received with acceptable interference from said transmitting station. Thus, in case of a conflict, for instance because of a simultaneous transmission of data packets from different transmitting stations, for instance from different cells, a transmitting station which has sent a data packet to the receiving station avoids the continuation of the conflict by stopping the transmission and rescheduling the transmission of further data packets into a different data transmission resource.

To inform a receiving station if the transmitting station from which it has received a data packet intends to continue with the transmission of further data packets it is proposed in a further embodiment that a transmitting station transmits a continue indicator along with a data packet indicating if at least one further data packet shall be transmitted to the receiving station in the same data transmission resource. In response the receiving station, to which the transmitting station transmits a signal, transmits a reservation indicator value indicating that the data transmission resource has been reserved for reception of at least one further data packet if said continue indicator indicates that at least one further data packet shall be transmitted in the same data transmission resource, as proposed according to a further embodiment, and that the last data packet has been received with acceptable interference from said transmitting station.

According to further embodiments, as defined claims 12 to 14, the transmitting stations are adapted for checking if a received reservation indicator is valid before continuing the transmission using the same transmission resource. Preferably, the path gain of the received reservation indicator is determined and checked against the expected path gain used in the previous transmission of the transmitting station for this purpose. If it is thus found that the received reservation indicator is invalid, then the transmission will be rescheduled so that the transmitting station will use a different transmission resource for the next data transmission. Otherwise—if the received reservation indicator is found valid—the same transmission resource can be used again. This provides an additional secure and simple measure to prevent incorrect reservations of a transmission resource and possible collisions of reservation indicators.

BRIEF DESCRIPTION OF THE DRAWINGS

The invention will now be explained in more detail with reference to the drawings in which.

DETAILED DESCRIPTION OF THE PREFERRED EMBODIMENT(S)

Figure 1:
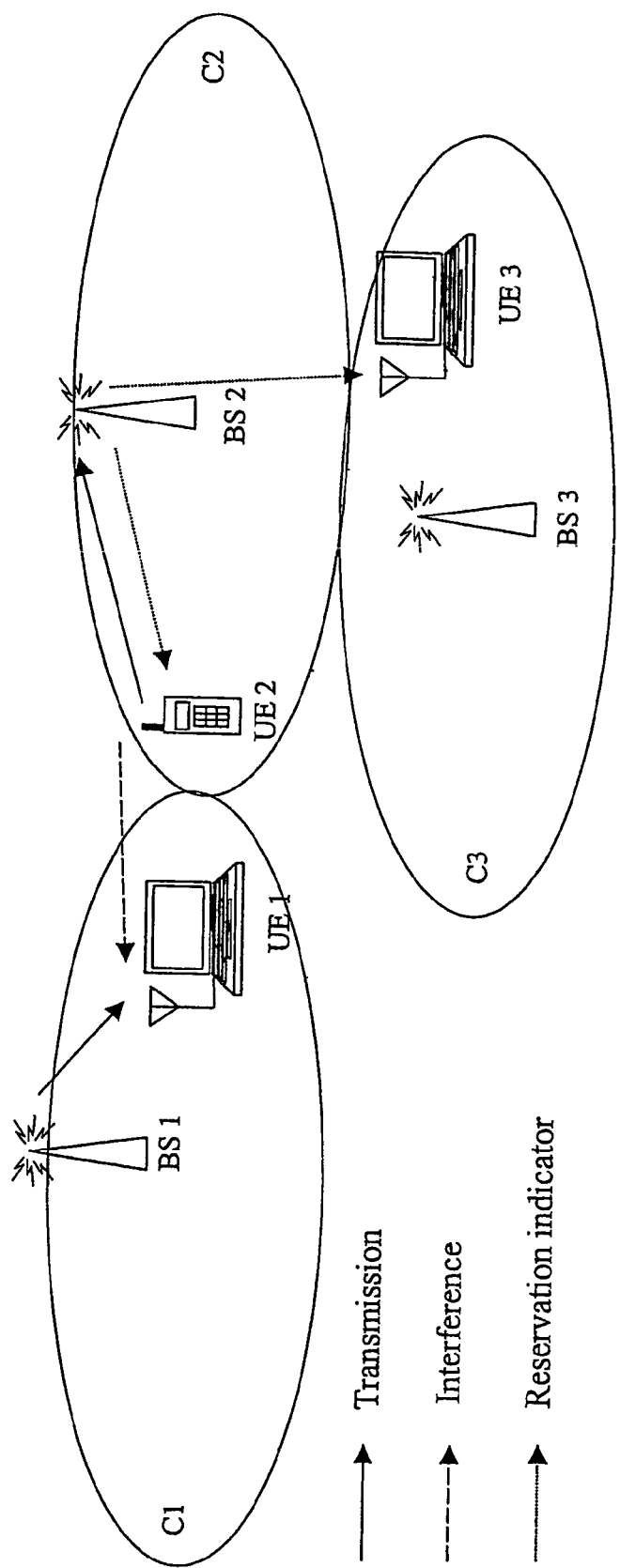
FIG. 1 shows a first embodiment of a cellular communications network using TDD.

FIG. 1 shows a first embodiment of a cellular communications network according to the invention, in the example comprising three cells C1, C2, C3, for each of which one base station BS1, BS2, BS3 and one user equipment UE1, UE2, UE3, for instance a mobile station, a PC or any other terminal, are symbolically shown. Further, by means of different arrows, the transmission of signals, the transmission of a reservation indicator and the occurrence of a conflict due to an interference are indicated. This shall be illustrated by way of the protocols shown in FIG. 2.

Figure 2:
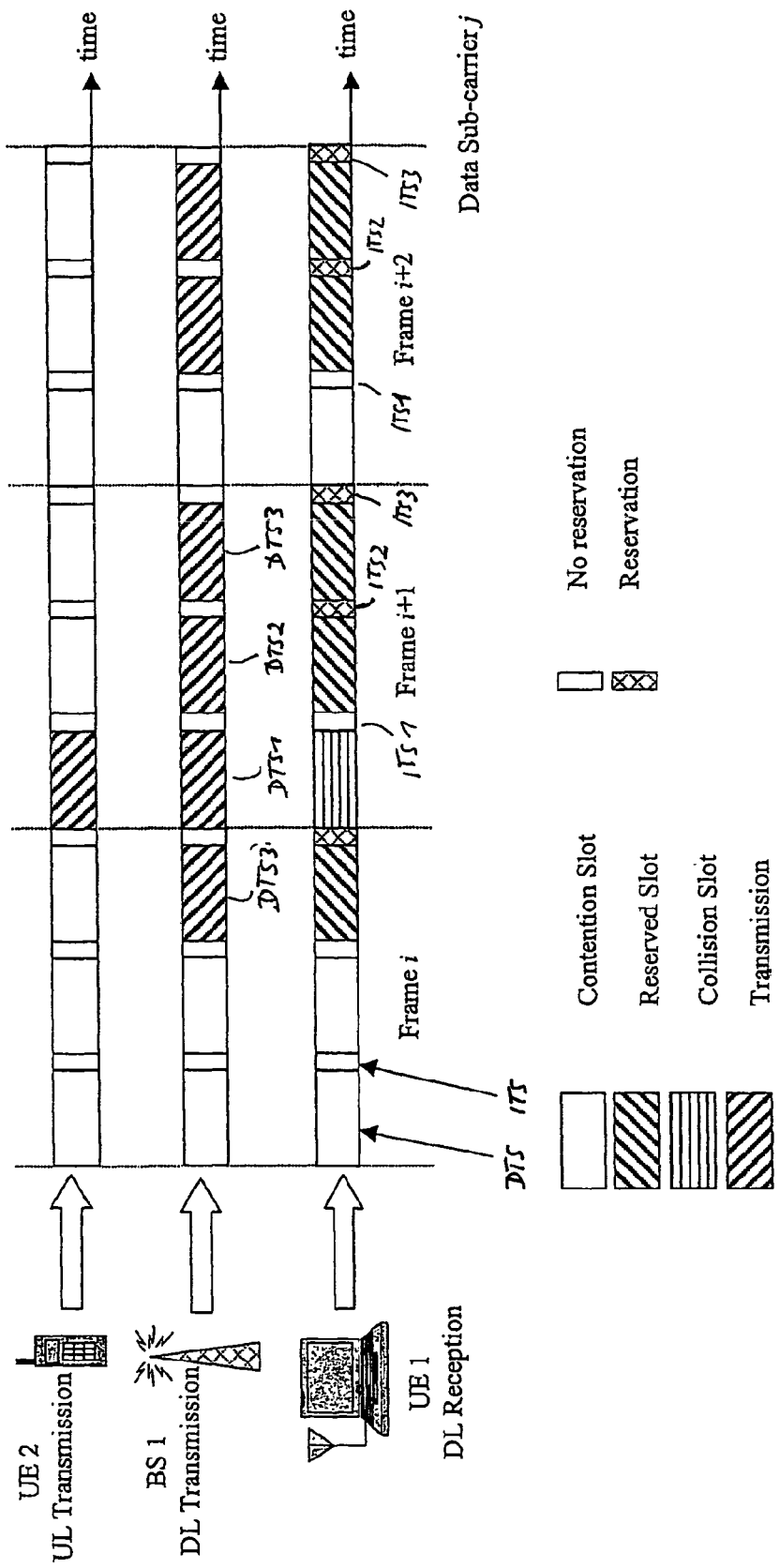
FIG. 2 shows the protocols used in the embodiment of FIG. 1 using indicator time slots.

In FIG. 2 the protocols as used in a TDMA TDD system are shown for the uplink transmission from the user equipment UE2 to the base station BS2 in cell C2, for the downlink transmission from the base station BS1 to the user equipment UE1 in cell C1 and for the downlink reception of the user equipment UE1 and its emission of a reservation indicator. As can be seen the, transmission of signals is established by transmitting a series of data packets in particular data time slots DTS in frames of a particular data sub-carrier j, i.e. all packets of a particular signal are originally scheduled to be sent in the same (fixed) data time slot DTS with subsequent frames. In TDMA TDD, data time slots DTS are thus organized into frames, and a data time slot DTS is either in contention or in reservation. There is no intra-cellular contention as the BS is in control locally at the cell level, and schedules transmissions to avoid collisions among users in the same cell.

The transmission from the base station BS1 to the user equipment UE 1 starts in frame i with the third data time slot DTS3, and continues in all three data time slots DTS1, DTS2 and DTS3 in frame i+1. However, in the first data time slot DTS1 of frame i+1 also user equipment UE2 transmits a data packet to its base station BS2 thus leading to a conflict and an interference at the receiving user equipment UE1, as indicated in its reception protocol as collision slot and as shown in FIG. 1 by the arrow "interference". In other data time slots DTS2 and DTS3 in which only the base station BS1 transmits data packets no collision happens.

As further shown in the protocols of FIG. 2 conflict-signalling indicator time slots ITS are provided between the data time slots, i.e. at the end of each data time slot an indicator time slot ITS is provided assigned to the previous data time slot DTS, in which a reservation indicator can be transmitted by a receiving station. In the shown example the receiving station UE1 emits a reservation indicator after correct receipt of the data packet transmitted in data time slot DTS3 of frame i, indicating to the transmitting station BS1 that the data packet has been received without unacceptable interference and indicating to other transmitting stations in the same cell C1, which listen if a corresponding reservation indicator is received before sending data packets in the same data time slot DTS3, that this data has been reserved for another transmitting station (i.e. the transmitting station BS1) to deter them from sending data packets in the same data time slot DTS3.

However, in the case of the collision in data time slot DTS1 of frame i+1 the receiving station does not emit a reservation indicator (or emits a different indicator value) in the indicator time slot ITS1 indicating to the transmitting station BS1 that the data packet sent in data time slot DTS1 of frame i+1 has not been received without unacceptable interference and indicating to all transmitting station that the data time slot DTS1 is no longer reserved in subsequent frames, e.g. in the next frame i+2, which is indicated by not emitting a reservation indicator in the indicator time slot ITS1 in subsequent frames, e.g. in the next frame i+2.

In the next frame i+2 thus only data time slots DTS2 and DTS3 are reserved for the transmission of data packets by the transmitting station BS1, which is indicated by the emission of respective reservation indicators in indicator time slots ITS2 and ITS3, although the transmitting station UE2 also has stopped the transmission of data packets in the first data time slot DTS1 in frame i+2.

Figure 3:
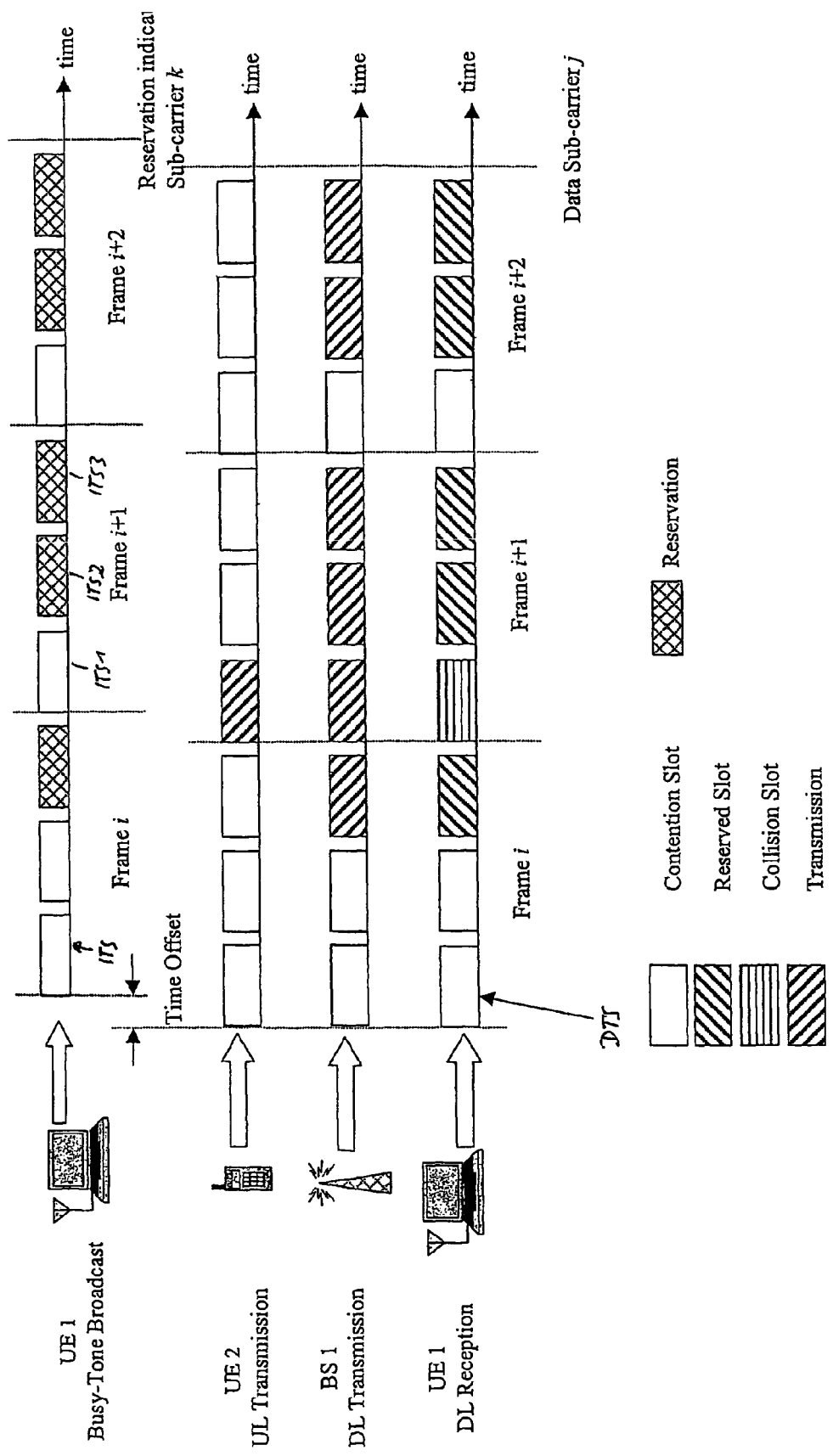
FIG. 3 shows the protocols used in the embodiment of FIG. 1 using an indicator sub-carrier.

In the embodiment shown in FIG. 2 separate indicator time slots ITS are provided in the same data sub-carrier j for the transmission of the reservation indicator by a receiving station. In another embodiment, as shown in FIG. 3, a separate reservation indicator sub-carrier k is provided for this purpose. It is to be noted that the transmission of the reservation indicator is also referred to as broadcast of a "busy-tone". Thus, for each data time slot DTS of the data sub-carrier j a corresponding indicator time slot ITS is provided in the indicator sub-carrier k, possibly, but not necessarily emitted by the receiving station UE1 with a time offset with respect to the transmission of the data packet in the corresponding data time slot DTS. Apart from that, the function of the indicator time slots is identical as illustrated with reference to FIG. 2. Preferably, several different receiving stations use the same indicator sub-carrier.

Figure 4:
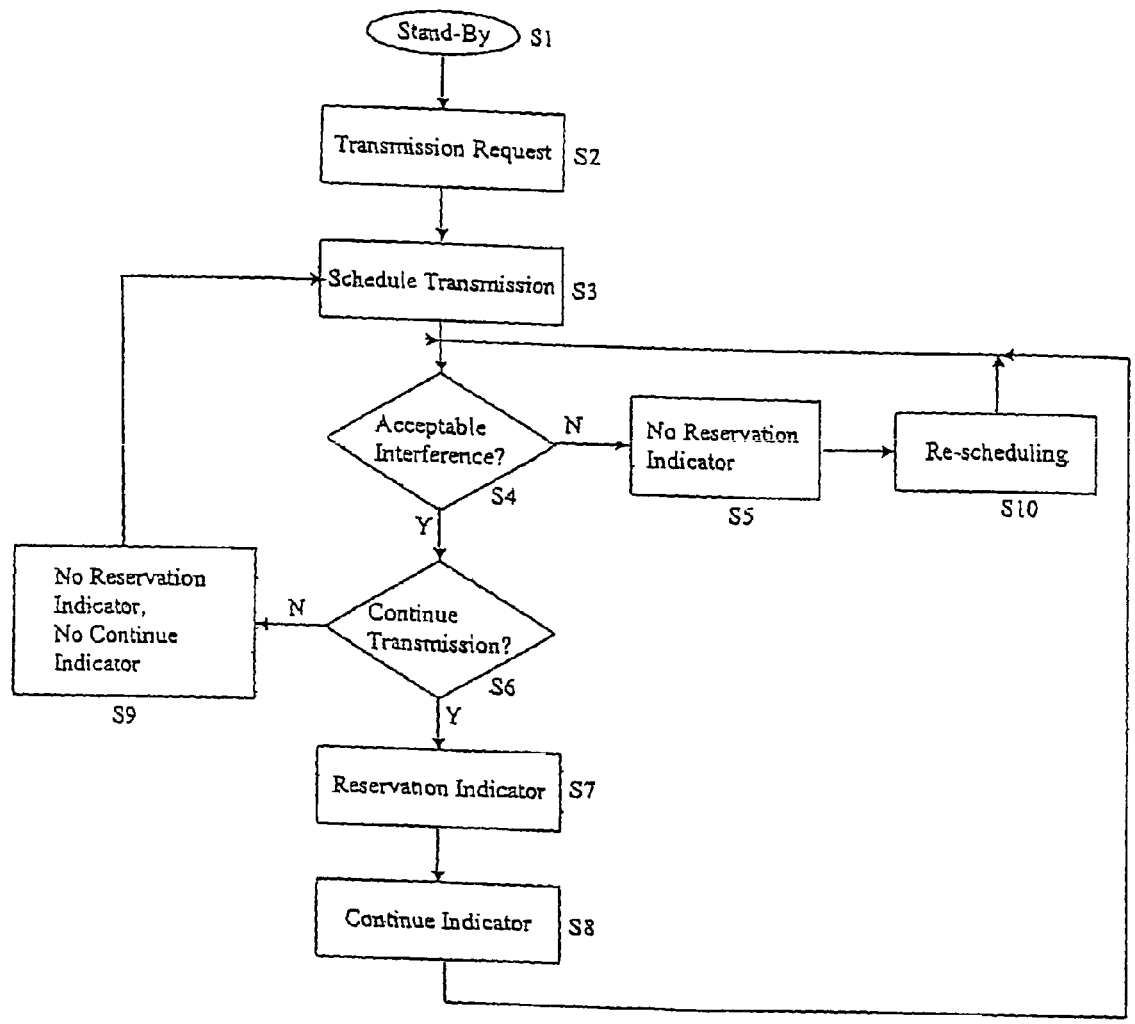
FIG. 4 shows a flow chart illustrating the communications method according to the present invention.

A flow chart of the communications method according to the present invention is shown in FIG. 4. The method comprises the following steps and behaves as follows:

1. When an uplink or downlink transmission needs to be sent according to a transmission request (S2) received by a station in stand-by mode (S1), the transmission has to be scheduled (S3). The transmission is scheduled in the next frame within an available contention slot (S3), which is determined by not hearing a busy signal (or reservation indicator) signalling a conflict.
2. If the transmission is received at the receiver (UL or DL) with unacceptable interference or in outage, i.e. both an inter-cell slot allocation conflict and, consequently, a collision have occurred, which is checked in step S4, no busy signal (or reservation indicator) is broadcast by the receiver, for instance in the corresponding conflict-signalling indicator time slot (S5), and the data time slot remains unreserved by the user, i.e. in contention.
3. If the transmission is received at the intended receiver (UL or DL) without unacceptable interference, which is checked in step S4, and the transmitter intends to continue using this slot in subsequent time frames, which is checked in step S6, then a busy signal (or reservation indicator) is broadcast by the receiver in the corresponding conflict-signalling indicator time slot (S7) and the data time slot is effectively reserved for exclusive use by the user, as all other users within hearing distance of the busy signal (reservation indicator) will not transmit in this data time slot in the next frame.
4. The transmitter indicates to the intended receiver, that it intends to reserve or continue using a data time slot in the next subsequent frame by means of a continue indicator, preferably a one-bit field, contained (piggy-backed) in its transmission (S8).
5. Therefore, once the transmitter has successfully reserved a data time slot it can retain the use of the same data time slot, in subsequent frames, for the duration of its burst, using the continue indicator contained in its transmission to signal the receiver, which then continues to broadcast the busy signal (reservation indicator).
6. The transmitter releases the reservation at the receiver by signalling an end of its burst using the continue indicator, and the receiver stops broadcasting the busy signal (reservation indicator) as a result (S9).
7. If the transmission is received at the intended receiver (UL or DL) without unacceptable interference (checked in step S4), but the transmitter indicates using the continue indicator that it does not intend to continue its transmission in subsequent time frames, then no busy signal (reservation indicator) is broadcast by the receiver and the data time slot is effectively unreserved, i.e. in contention (S9). The receiver then returns into stand-by mode (S0).
8. When a collision occurs, the transmitter involved is informed by the absence of an expected busy signal (or by a corresponding reservation indication value) in step S5 and it releases the use of the data time slot in subsequent frames, and the transmission is rescheduled to determine in which frame and in which data time slot it should be executed (S10).

Figure 5:
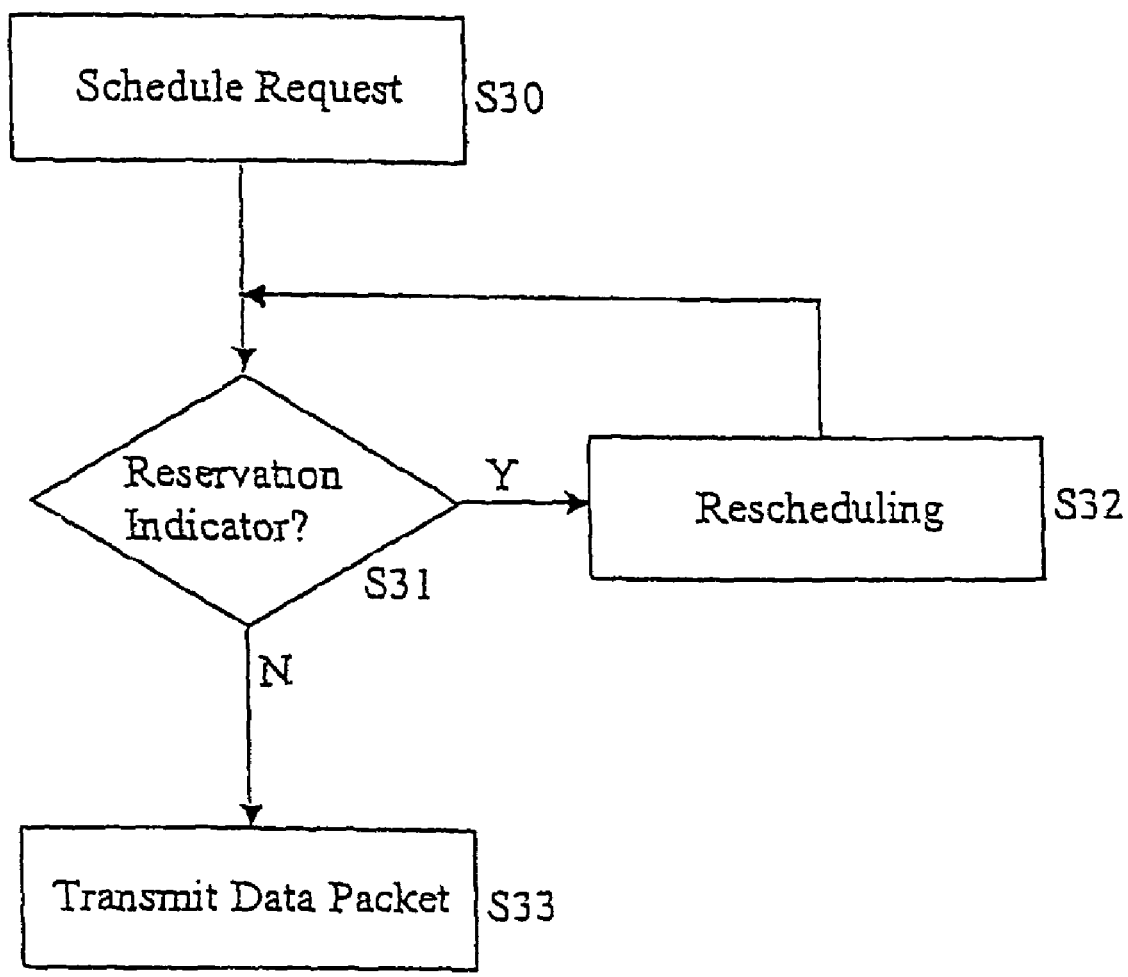
FIG. 5 shows a flow chart illustrating the step of scheduling a transmission.

The scheduling of a transmission (step S3) is shown in more detail in the flow chart of FIG. 5. When the BS schedules an UL transmission upon receipt of a schedule request (S30), the transmitter does not transmit in the scheduled data time slot, if the data time slot has been reserved (by hearing a busy signal or reservation indicator, S31) in a neighbouring cell. The transmitter is then rescheduled (S32) for a future frame. This avoids interference to the neighbouring cell's transmission but results in a wasted slot allocation in the cell in which the UL transmission was scheduled. However, this is generally unavoidable without some dedicated signalling (between UEs and BSs), which is overhead intensive. Since it is, otherwise, impossible for the BS to be aware, a priori, that a scheduled UL transmission will interfere with a receiver (UL or DL) in a neighbouring cell. If no reservation indicator is received, the data packet is transmitted in the scheduled data time slot (S 33).

However, the BS only schedules a DL transmission in contention data time slots (slots unreserved by neighbouring cells), that is data time slots in which it hears no prior busy signal (reservation indicator). This avoids interference to the neighbouring cell's transmission and also minimises the chances of a wasted slot allocation in the cell in which the DL transmission was scheduled. This is because the BS is the transmitter on the DL and so can hear busy signals (reservation indicators) from receivers it would interfere with.

If for some reason there is a collision in a reserved slot, due to mobility of UEs, the receiver stops broadcasting the busy signal (reservation indicator), which informs the transmitter to stop transmitting and the reservation is effectively terminated.

It can be seen from the above described figures that at any time a transmitter (UL or DL) can only hear one busy signal (reservation indicator), which comes only from its intended receiver, or no busy signal (reservation indicator) indicating a collision. This is because, if the transmitter can hear a busy signal (reservation indicator) from a receiver, other than its intended receiver, then that means that receiver can also hear its transmission, and thus a collision must have occurred at that receiver. Therefore, this receiver will also not broadcast a busy signal (reservation indicator). The performance of the protocol is expected to be affected by mobile speed, burst duration and busy-tone signalling transmit power, while overhead will be affected by the propagation delay and transmitter turn-around time. It requires synchronised data time slots and indicator time slots.

Figure 6:
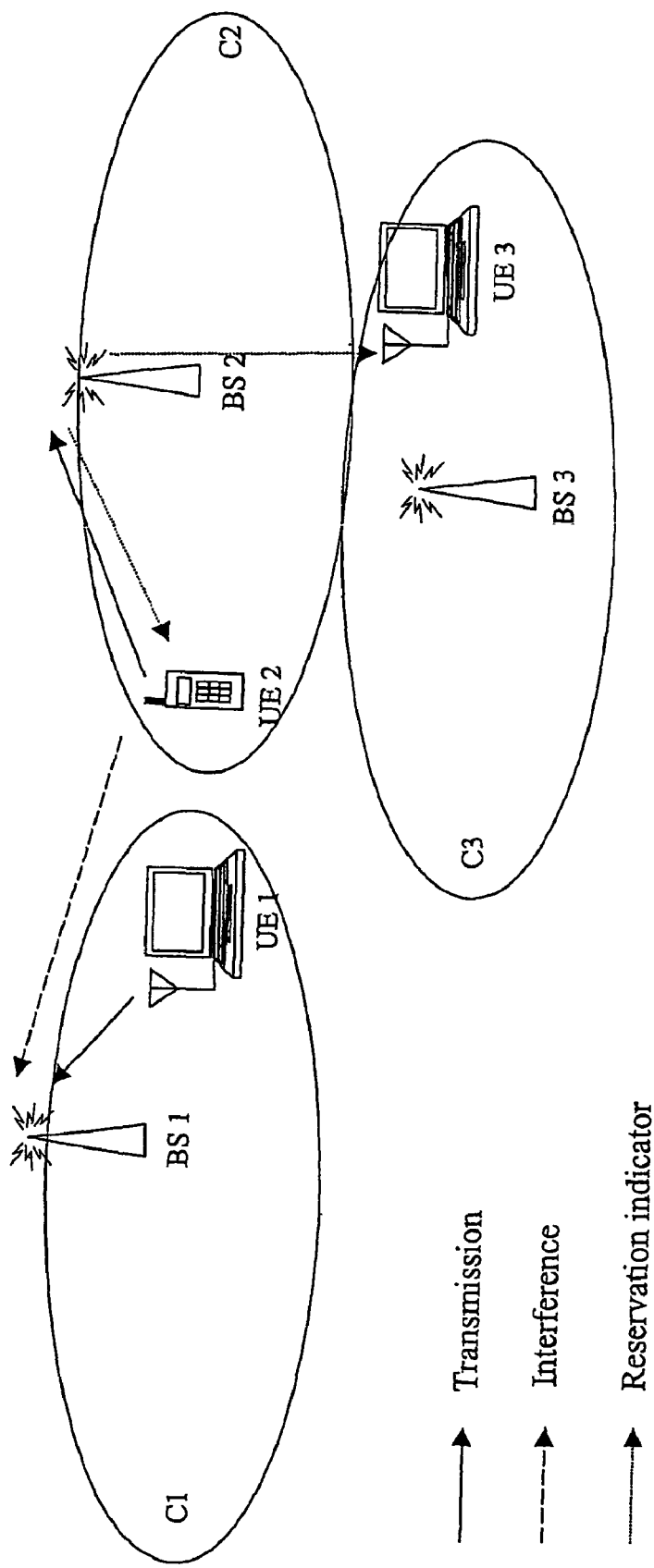
FIG. 6 shows a second embodiment of a cellular communications network illustrating an FDD uplink.
Figure 7:
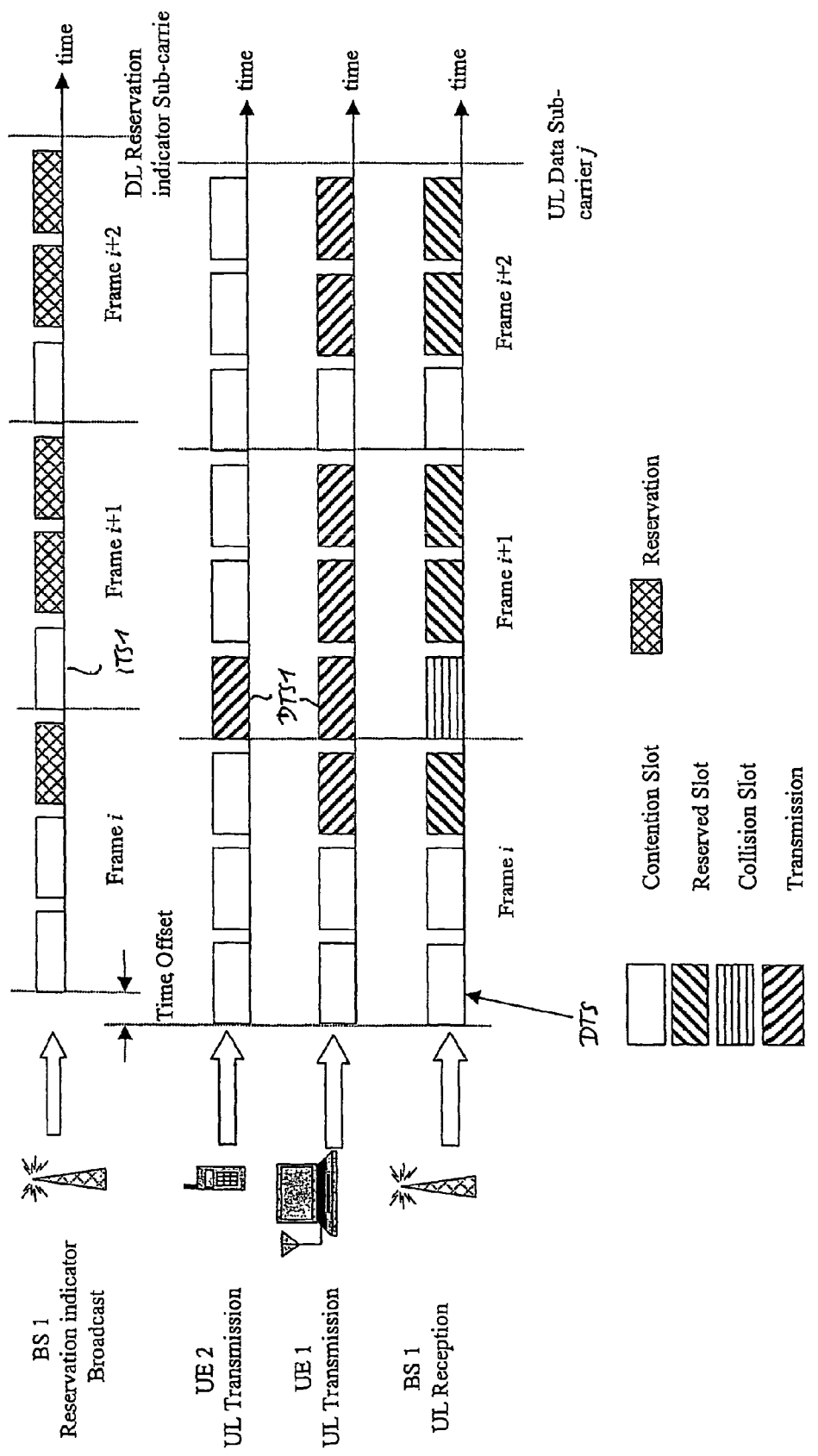
FIG. 7 shows the protocols used in the embodiment of FIG. 6 using an indicator sub-carrier, FIG. 8 showing the protocols used in the embodiment of FIG. 6 using continuous data transmission, FIG. 9 showing another embodiment of a cellular communications network illustrating an FDD downlink.

FIG. 6 shows another embodiment of a cellular communications network illustrating an FDD uplink. An embodiment of the corresponding protocols is shown in FIG. 7, which uses a separate reservation indicator sub-carrier k, similar to the embodiment of FIG. 3. As an example, a collision exists between an uplink transmission in cell C1 from UE1 to BS1 and an uplink transmission from UE2 to BS2 in data time slot DTS1 of frame i+1 (in the embodiment shown in FIG. 7). Therefore, as explained above with reference to FIGS. 2 and 3, no reservation indicator is emitted by the receiving station BS1 in indicator time slot ITS1 of frame i+1.

In the FDD embodiment, the indicator sub-carrier for an UL data sub-carrier is a DL sub-carrier, while it is an UL sub-carrier for a DL data sub-carrier, where UL and DL sub-carriers reside in separate frequency bands. This differs from the TDD embodiment of FIG. 3 in which case both the indicator sub-carrier and data sub-carrier reside within the same frequency band. Also, in the FDD case, a MS only sends the indicator to BSs and not to MSs, while a BS only sends the indicator to MSs and not to BSs. In the TDD case, a MS sends the indicator to both BSs and MSs, while a BS also sends the indicator to both MSs and BSs. This is because in FDD systems there is only MS-to-BS and BS-to-MS intercell interference. This is unlike TDD systems, where there is also MS-to-MS and BS-to-BS intercell interference.

Figure 8:
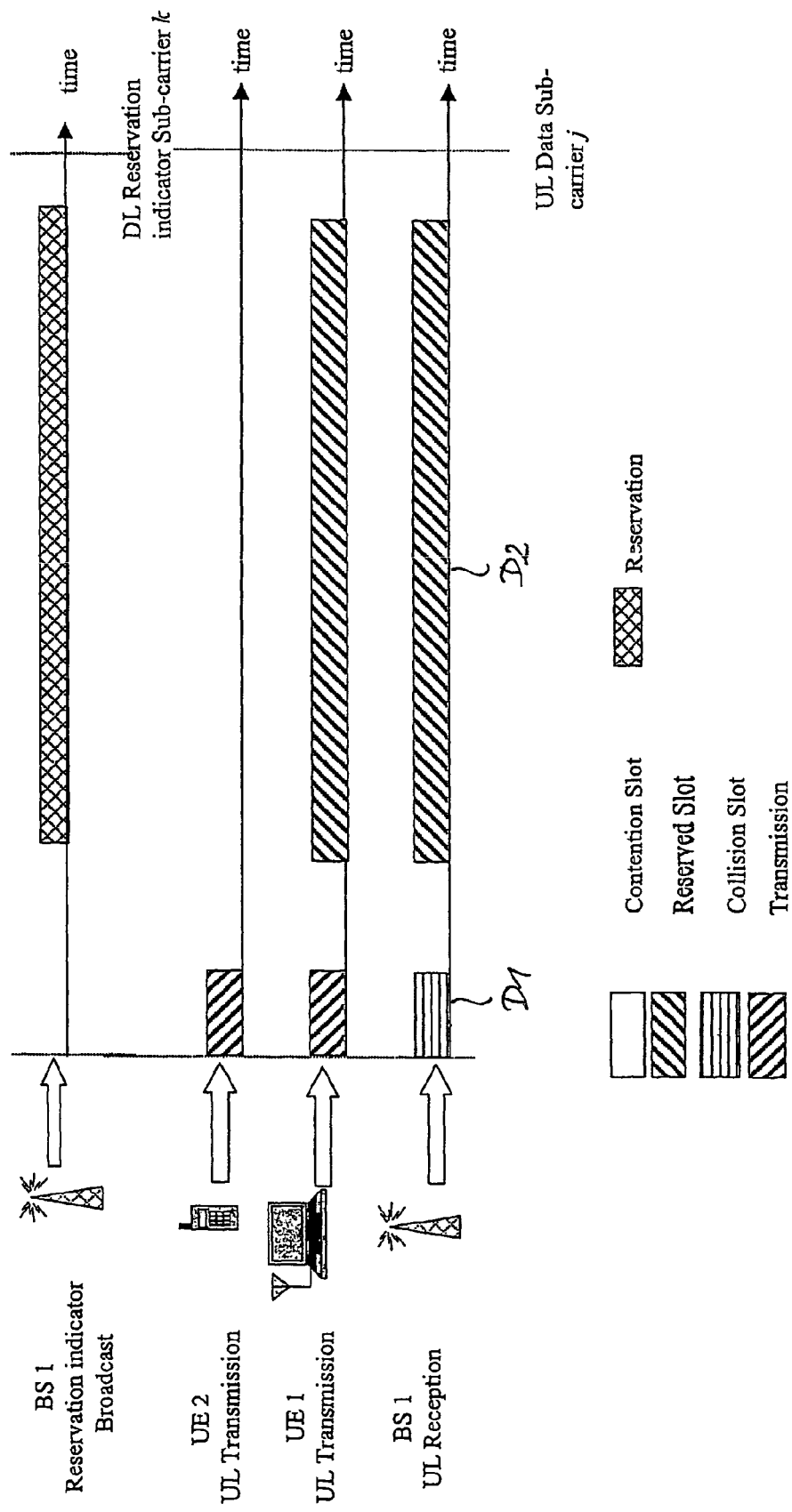

In FIG. 8 an embodiment using continuous data transmission or variable-size data packets instead of fixed-size data packets is shown for the conflict situation shown in FIG. 6. In case of a conflict on the uplink data sub-carrier j, as shown for time interval D1 where both UE1 and UE2 transmit data, no reservation indicator is emitted on the indicator sub-carrier. Also, if no data submitted by the transmitting station UE1, no reservation indicator is transmitted by the receiving station BS1. If the data sub-carrier is only used by the transmitting station UE1 and if the data are received by BS1 without unacceptable interference, a reservation indicator is transmitted on the indicator sub-carrier k as shown for time interval D2.

Figure 9:
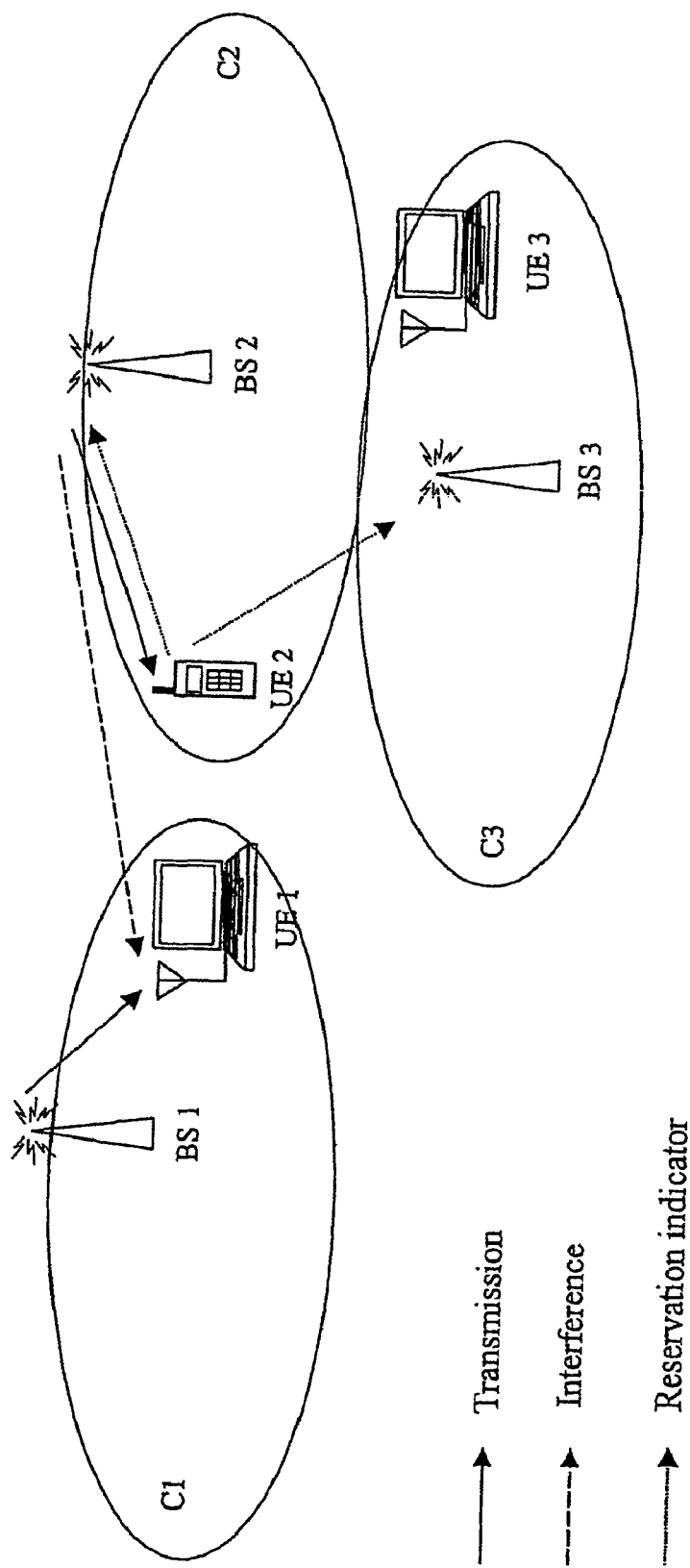
Figure 10:
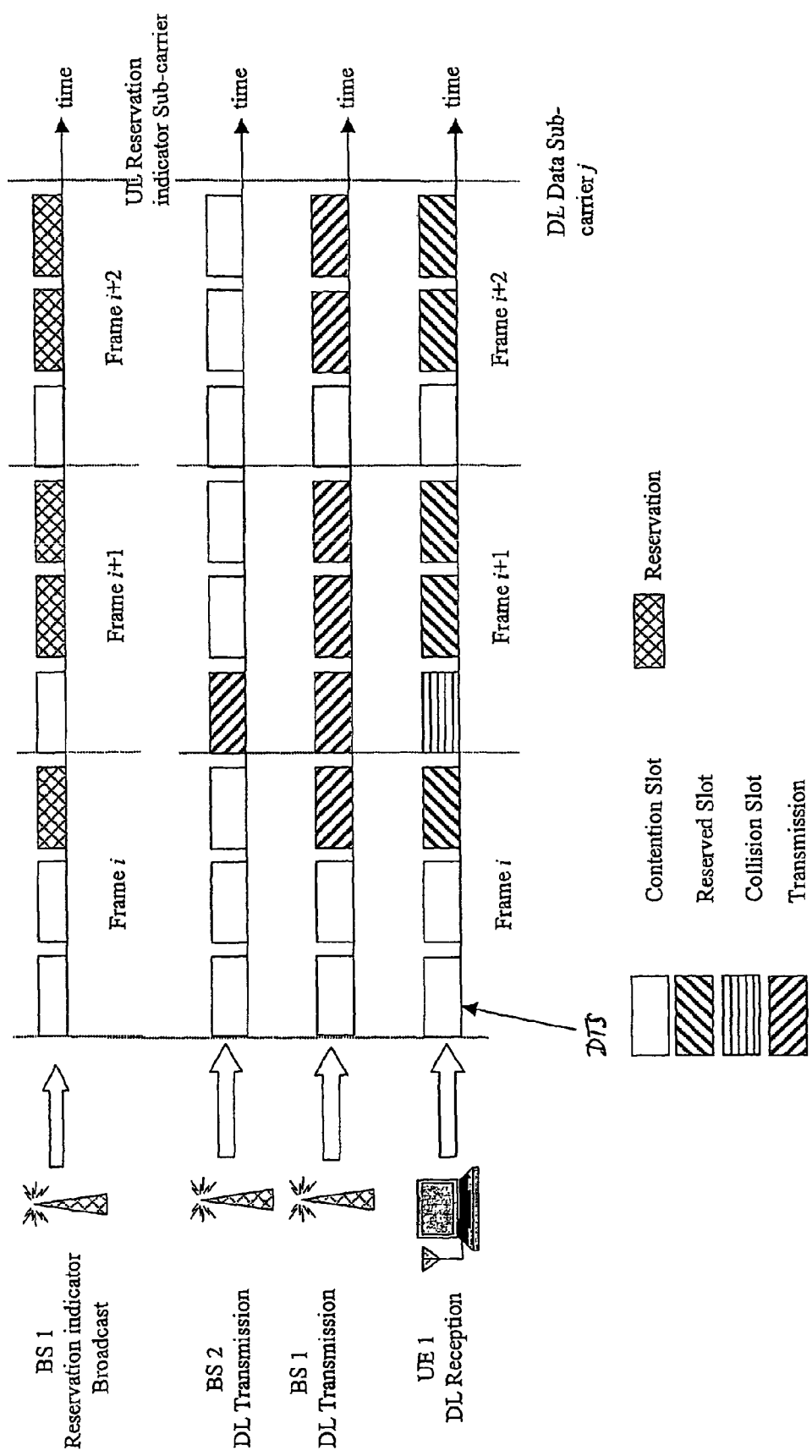
FIG. 10 shows the protocols used in the embodiment of FIG. 9 using an indicator sub-carrier.

In FIG. 9 another embodiment of a cellular communications network illustrating an FDD downlink. An embodiment of the corresponding protocols is shown in FIG. 10, which uses a separate reservation indicator sub-carrier k, similar to the embodiment of FIGS. 3 and 7. As an example, a collision exists between a downlink transmission in cell C1 from BS1 to UE1 and a downlink transmission from BS2 to UE2 in data time slot DTS1 of frame i+1 (in the embodiment shown in FIG. 10). Therefore, as explained above with reference to FIGS. 2 and 3, no reservation indicator is emitted by the receiving station BS1 in indicator time slot ITS1 of frame i+1. As shown in this embodiment, the time offset between the data time slots and the corresponding indicator time slot could be zero.

Figure 11:
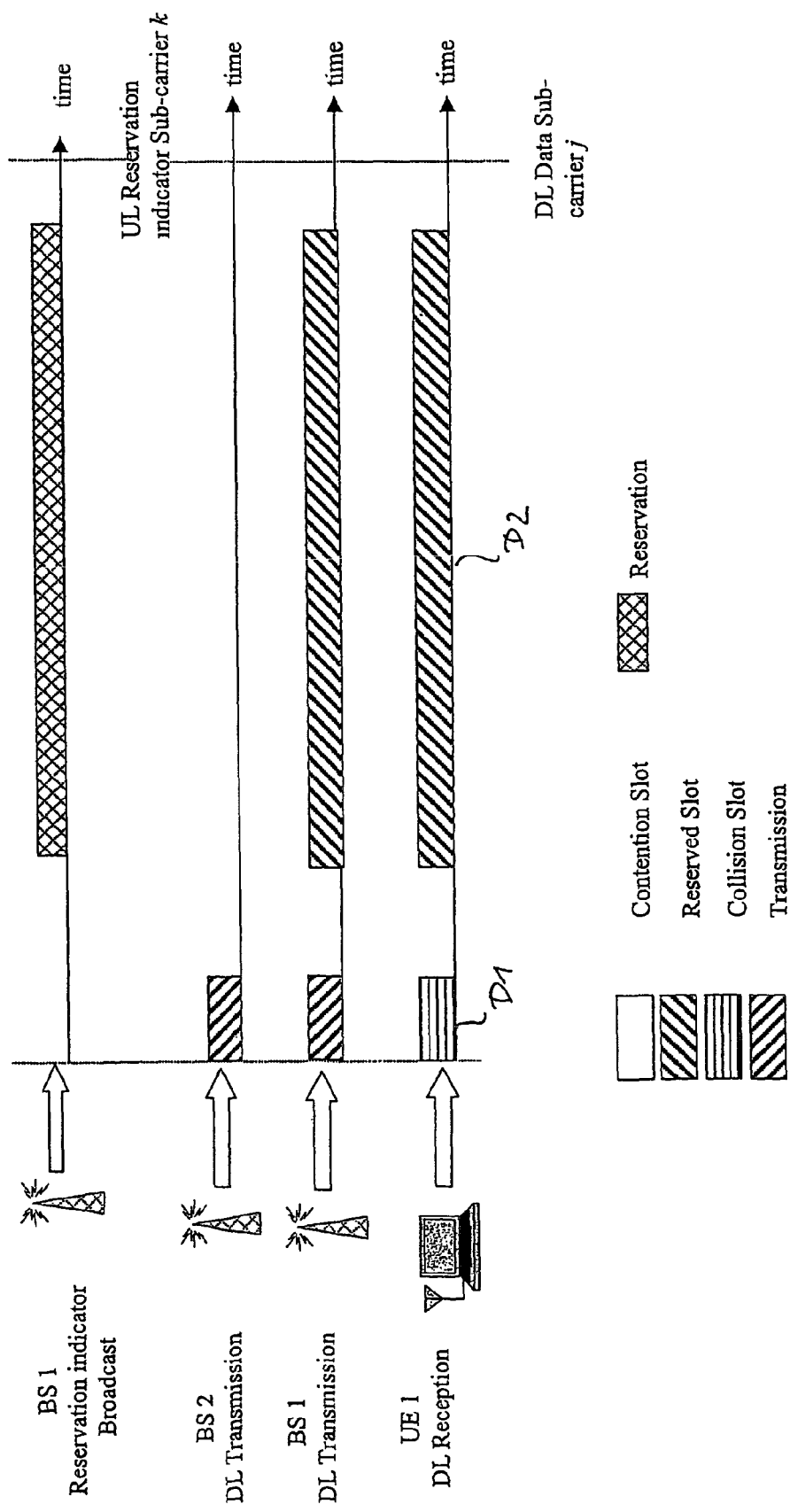
FIG. 11 shows the protocols used in the embodiment of FIG. 9 using continuous data transmission.

In FIG. 11 an embodiment using continuous data transmission or variable-size data packets instead of fixed-size data packets is shown for the conflict situation shown in FIG. 9, similar to the embodiment shown in FIG. 8.

The present invention is preferably applicable in a TDMA communications system, which particularly uses a TDD and FDD mode. But the invention can also be applied in other networks, like CDMA and FDMA networks. In case of CDMA, data codes are used as data transmission resource, instead of, or in addition to data time-slots/sub-carriers. In case of FDMA, data carriers are used as data transmission resource, instead of, or in addition to data time-slots/sub-carriers. Protocols for a CDMA or FDMA embodiment are similar to the protocols shown in FIGS. 8 and 11, where "sub-carrier" is replaced by "code" (for CDMA) or "carrier" (for FDMA), respectively.

Figure 12:
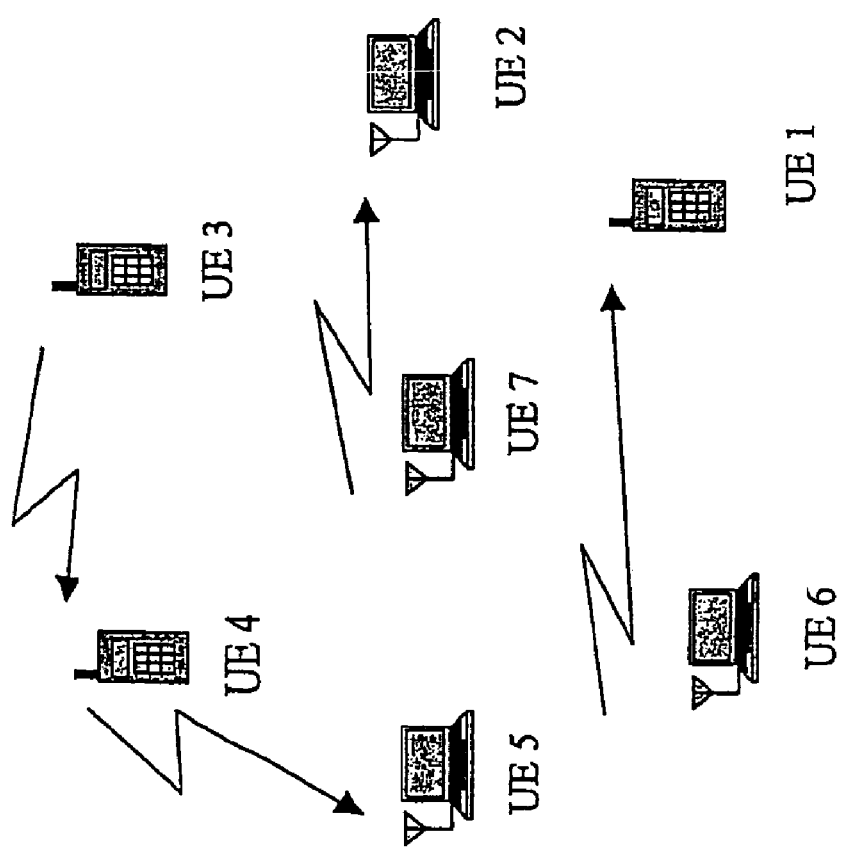
FIG. 12 shows an embodiment of a hybrid cellular/ad-hoc communications network according to the present invention.

In a TDD system, called CSTDMA TDD, the proposed protocol addresses the following problems:
1. MS-to-MS/BS-to-BS interference or UL-to-DL/DL-to-DL interference: CSTDMA TDD mitigates this interference scenario by minimising the chances of this conflict between neighbouring cells. The busy signal (reservation indicator) ensures that there is no collision at a receiver once it has reserved a data time slot for the duration of a burst.
2. MS-to-BS/BS-to-MS interference or UL-to-UL/DL-to-DL interference: CSTDMA TDD mitigates this interference scenario by minimising the chances of this conflict between neighbouring cells, in a similar way as mentioned in 1. above.
3. The required overhead is kept to a minimum, with one small indicator time slot per data time slot at most, and thus avoids the significant overhead problem associated with global centralised scheduling.
4. The significant complexity associated with global centralised scheduling is avoided.
5. The invention improves centralised intra-cell scheduling performance: CSTDMA TDD is effectively a distributed inter-cell scheduler and works with the local centralised intra-cell scheduler within each cell, without requiring any changes in these algorithms. This compatibility allows for a beneficial partnership between the two. The centralised scheduler better supports real-time delay constraints (QoS), but fails in the presence of uncontrolled inter-cell interference in a TDMA TDD multi-cell environment with 100% frequency reuse. CSTDMA TDD controls this interference, while respecting QoS constraints, and so allows for improved local centralised scheduling performance and hence better QoS support of the local centralised scheduler in the multi-cell environment.
6. Seamless ad-hoc and cellular mobile operation: CSTDMA TDD is a distributed MAC protocol and so is directly applicable to ad-hoc communications networks as shown in FIG. 12. This is particularly important for next generation wireless communications, which will have ad-hoc components operating within the cellular mobile framework, in order to achieve high-speed communications. CSTDMA TDD does not explicitly depend on communication being organised in an UL/DL fashion and so it can operate in ad-hoc networks that lack any hierarchy. However, modern ad-hoc wireless standards propose such a hierarchy, which organises the network at any time, in such a way that there are nodes that function effectively as BSs and others as MSs. Further, hybrid cellular/ad-hoc communications networks are under consideration comprising ad-hoc clusters, regions of cellular users and regions of ad-hoc mode users. In either case CSTDMA is readily applicable.

Figure 13:
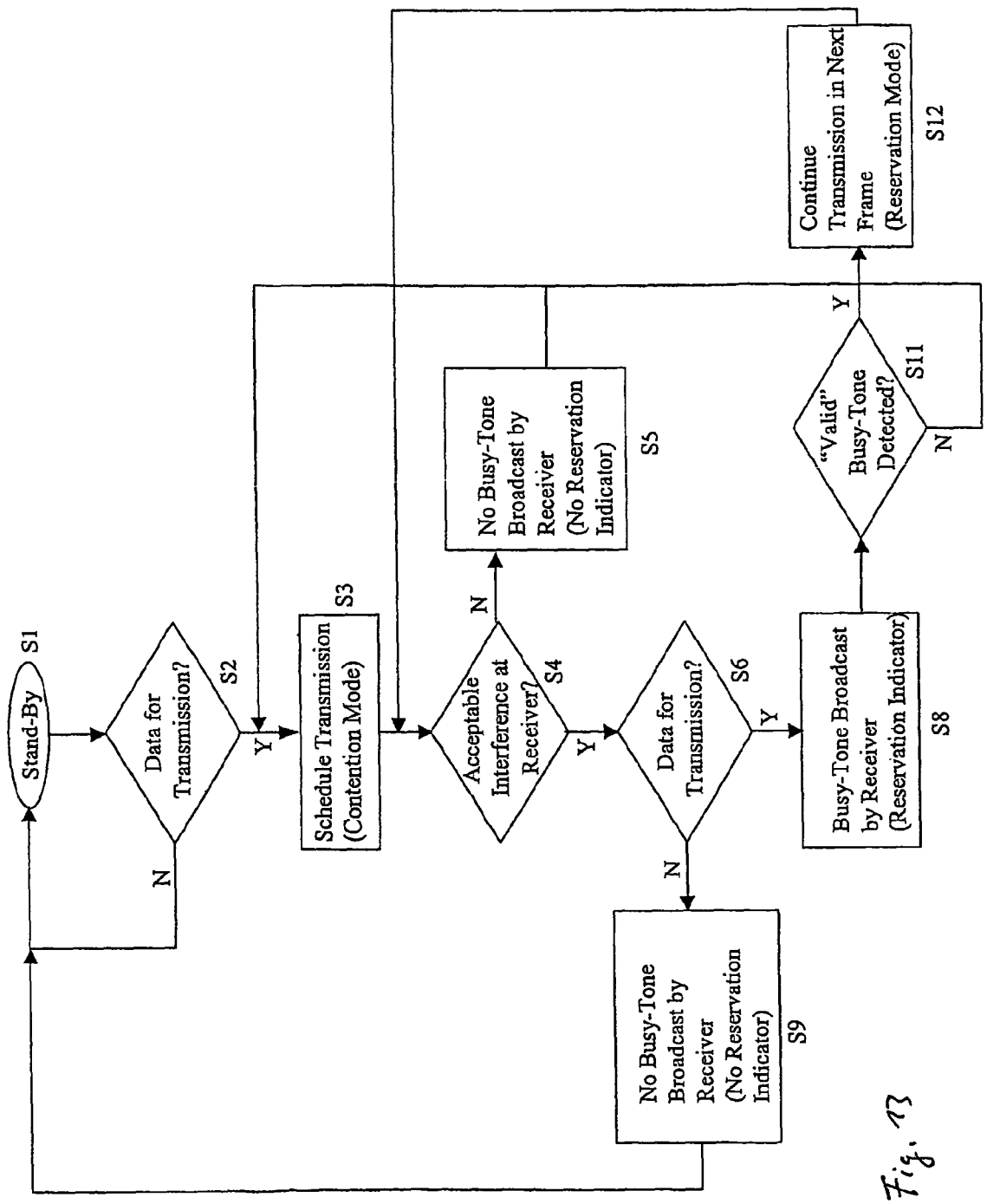
FIG. 13 shows a flow chart illustrating another embodiment of the communications method according to the present invention.

FIG. 13 shows flow chart illustrating another embodiment of the method according to the present invention. Steps S1 to S9 substantially correspond to steps S1 to S9 illustrated in FIG. 4. Blocks S7 and S8 shown in FIG. 4 have been combined into one block S8 in FIG. 13, because S8 in FIG. 4 is redundant. All the functionality of block S10 in FIG. 4 shall now be considered to be included in block S3, and so these two blocks have been combined into one block S3 in FIG. 13. Further, in FIG. 13, block S9 is connected to block S1, rather than to block S3 as in FIG. 4, in order to clarify that the transmission station has no subsequent data packet to transmit.

Block S11, which is not included in FIG. 4, has been added to FIG. 13 to offer additional protection to the busy-tone detection process against false reservations and corruption from interference. Block S12, which is also not included in FIG. 4, has been added to FIG. 13 to clarify that the reserved transmission resource is in the next frame.

There are two different conditions under which a reservation indicator (busy-tone) is detected, for two different types of users (transmitting stations). For a user that did not transmit data in a given time slot (more generally, in a given data transmission resource), but intends to use it in the next time frame, it detects a reservation indicator in the indicator time slot (more generally, in a given indicator transmission resource assigned to said data transmission resource) for that time slot only when the following condition is satisfied:

$$(P_{RB}/P_{TB}) \times P_{TD} \geq I_{thresh}$$

where $P_{TB}$ is the fixed, known busy-tone (reservation indicator) transmit power, $P_{RB}$ is the received busy-tone power, $P_{TB}$ is the intended data transmit power of the user listening to the busy-tone and $I_{thresh}$ is the interference threshold, i.e., the maximum acceptable value of interference from a transmitting station to another station. This condition shows that a user only detects the busy-tone broadcast of a receiver, if its own transmit power will cause interference higher than $I_{thresh}$ to that receiver. Therefore, the "exact" interference between potentially interfering nodes can be determined before slot-allocation and thus unacceptable interference can be avoided. This method is preferably used in S31 of FIG. 5 to detect the busy-tone (reservation indicator).

For a user that did transmit data in a given data time slot, it detects a busy-tone in the indicator time slot for that data time slot, as long as the received signal strength is above its receiver sensitivity. It will continue the data transmission (step S12 in FIG. 13) if the received busy-tone is checked to be valid. However, it "responds" to this busy-tone as a busy-tone from a non-intended receiver, when the ratio $P_{RB}/P_{TB}$, which equals the path gain between the user and the receiver sending the busy-tone, is a certain, preferably predetermined percentage greater or less than its "known" path gain to its intended receiver. This is an indication of receiving a busy-tone from a non-intended receiver or of interference corruption of the busy tone. The "known" path gain is obtained from a power control process between a transmitting station and its intended receiving station that exists a priori to any data communication between them and independently of this protocol. In other words, it assumes that it has not received a "valid" busy-tone signal from its intended receiver, and if the transmitter did intend to continue transmission in the next frame, it re-schedules transmission in step S3 within a contention slot in a subsequent frame. This is the method used in S11 shown in FIG. 13 to detect the busy-tone, and represents an improvement to the method illustrated, in FIG. 4.

Preferably, it is checked if the received path gain is substantially greater than the expected, known path gain, for instance by more than 5 or 10%, which would then lead to the conclusion that an invalid reservation indicator (busy-tone signal) has been received.

This improvement is necessary, in order to prevent "false reservations" and "busy-tone collisions", since no "explicit" addressing is signalled in this protocol. Otherwise, "false reservations" occur when a transmitter with an ongoing transmission in a given time-slot detects a busy-tone in the slot's indicator time slow from a non-intended receiver, but not from its intended receiver due to outage of its data, and continues transmission in this time slot causing interference to the non-intended receiver, while its own data is received in outage. Also otherwise, "busy-tone collisions" occur when a transmitter with an ongoing transmission in a given time slot detects a busy-tone contribution from a non-intended receiver to that from its intended receiver due to changes in the relative position of the users involved, which as can be seen from the above condition affects the accuracy interference estimation of the protocol.

The method of block S11, which avoids these scenarios preferably requires a power control implementation on both the uplink and downlink, which is used to maintain an acceptable received signal strength at the receiving station using feedback sent by the receiving station to the transmitting station, where there is path-gain information between every mobile station and its serving base station, available to both the mobile station and the base station, and it requires access to this information.

The invention applies the "busy-tone" broadcast approach, in a novel way, for application in cellular mobile, ad-hoc and hybrid networks. It introduces a novel concept of an 'active' distributed scheduling inter-cell MAC, which employs carrier-sensing and busy-tone signalling, in order to perform fast dynamic channel allocation to mitigate inter-cell interference and conflicts. This is distinct from traditional overhead intensive and, hence, slow centralized inter-cell dynamic channel allocation or passive, slow distributed inter-cell dynamic channel allocation schemes that are based on channel hopping. Therefore, the traditional approaches are ineffective in providing real-time inter-cell interference rejection. A better performance is expected from the proposed method.

Specifically, the invention applies (inter-cell) MS-to-MS signalling to resolve inter-cell interference in a cellular mobile network, where traditionally there is no MS-to-MS communication. Also, it applies active carrier-sensing and busy-tone signalling between all nodes in the cellular mobile network to resolve intercell interference in real-time and so minimizes overhead and achieves a high performance. In addition to MS-to-MS signalling, BS-to-BS, MS-to-BS and BS-to-BS signalling are supported for this purpose.

Further, it provides a beneficial partnership of centralized intra-cell scheduling and distributed inter-cell scheduling, by mitigating in real-time varying inter-cellular interference and thus allowing near ideal intra-cell scheduling. Traditional approaches either rely totally on centralized intra-cell scheduling (cellular mobile) or distributed intra-cell scheduling (WLANs). In both cases, either 100% frequency re-use is not used or slow dynamic channel allocation schemes are employed to combat inter-cell interference. These are not very effective when supporting very bursty traffic, as in 3G and 4G communications.

The proposed protocol adapts autonomously and dynamically to the network topology and cell-size. It can seamlessly operate in ad-hoc, hybrid or cellular mobile mode, while supporting QoS, without any change to the protocol. Traditional approaches require two separate protocols for ad-hoc and cellular mobile operation. This results from the fact that the protocol is built around busy-tone broadcasts by receivers. In larger cells with most MSs away from the cell edge, the intra-cell scheduler dominates the proposed method, since not much inter-cell interference is present. But as cell sizes diminish and more MSs are closer to the edge of cells, then the proposed method dominates. In the limit, as the system reduces to direct peer-to-peer communication the proposed method becomes the default MAC, as there is little or no centralized scheduling.

The invention claimed is:

1. A communications network comprising
a plurality of transmitting stations and receiving stations for transmitting and receiving signals, the transmitting stations being adapted for transmitting a data signal as a series of data packets, wherein a data packet is scheduled to be transmitted by a transmitting station by use of an available transmission resource, and the receiving stations being adapted for transmitting a reservation indicator for reception by transmitting stations, wherein the reservation indicator transmitted by a receiving station, in the plurality of receiving stations. in response to a reception without unacceptable interference of a first data packet from a first transmitting station, in the plurality of transmitting stations, indicates to the first transmitting station that the receiving station has received the first data packet without unacceptable interference, and indicates to a second transmitting station, in the plurality of transmitting stations, intending to transmit a data packet and also hearing the reservation indicator that a data transmission resource has been reserved by the receiving station for reception of the next data packet of a data signal from the first transmitting station transmitting the data signal and that the data transmission resource is not allowed to be used by the second transmitting station for a transmission of a data packet by the second transmitting station, and wherein not hearing the reservation indicator by the second transmitting station indicates to the second transmitting station that a data transmission resource has not been reserved and can be used by the second transmitting station for transmitting the data packet or indicates to the first transmitting station that the last data packet transmitted by the first transmitting station has not been received with acceptable interference from the first receiving station, wherein each data packet is transmitted in a fixed data time slot of a plurality of data time slots within a time frame of a series of subsequent frames, wherein an indicator time slot is assigned to each data time slot of each frame, and wherein the reservation indicator transmitted by the receiving station in an indicator time slot indicates, whether the associated data time slot has been reserved in a subsequent time frame for transmission of the next data packet by the transmitting station, the associated data time slot in the subsequent time frame representing the data transmission resource, and wherein not hearing a reservation indicator in an indicator time slot indicates to the second transmitting station that the associated data time slot in the subsequent time frame can be used by the second transmitting station for transmitting a data packet.

2. A communications network as claimed in claim 1, wherein a data transmission. resource for the transmission of data packets of a signal is selected based on the reservation indicator.

3. A communications network as claimed in claim 1, wherein the first transmitting station transmits a continue indicator along with a data packet indicating, whether at least one further data packet shall be transmitted to the receiving station in the same data transmission resource.

4. A communications network as claimed in claim 3, wherein the receiving station, to which the first transmitting station transmits a data packet, transmits the reservation indicator indicating that the data transmission resource has been reserved for reception of at least one further data packet when the continue indicator indicates that at least one further data packet shall be transmitted in the same data transmission resource by the first transmission station.

5. A communications network as claimed in claim 1, wherein the network is a cellular communications network, an ad-hoc communications network or a hybrid cellular/ad-hoc communications network.

6. A communications network as claimed in claim 1, wherein the transmitting stations are adapted for checking, whether a received reservation indicator is a valid reservation indicator.

7. A communications network as claimed in claim 6, wherein the transmitting stations are adapted for checking the validity of a received reservation indicator by determining an actual path gain for the received reservation indicator and by comparing the actual path gain to an expected path gain.

8. A communications network as claimed in claim 7, wherein the transmitting stations are adapted for judging a received reservation indicator as invalid when the actual path gain is substantially different from the expected path gain.

9. A communications network as claimed in claim 8, wherein the transmitting stations are adapted for judging a received reservation indicator as invalid, when a percentage error between the actual path gain and the expected path gain is larger than a predetermined threshold of 5%.

10. A method of communicating in a communications network comprising a plurality of transmitting stations and receiving stations for transmitting and receiving signals comprising the steps of:

transmitting a data packet of a data signal having a series of data packets by a first transmitting station using an available transmission resource, transmitting a reservation indicator by a receiving station, in response to a reception without unacceptable interference of a first data packet from the first transmitting station, the reservation indicator indicating to the first transmitting station that the receiving station has received the first data packet without unacceptable interference, and indicating to a second transmitting station intending to transmit a data packet and also hearing the reservation indicator that a data transmission resource has been reserved by the receiving station for reception of the next data packet of a data signal from the first transmitting station transmitting the data signal;

transmitting the next data packet by the first transmitting station using the data transmission resource, when the first transmitting station has heard the reservation indicator; and transmitting a data packet by the second transmitting station using the data transmission resource, when the first transmitting station has not heard the reservation indicator, wherein each data packet is transmitted in a fixed data time slot of a plurality of data time slots within a time frame of a series of subsequent frames, wherein an indicator time slot is assigned to each data time slot of each frame, and wherein the reservation indicator transmitted by the receiving station in an indicator time slot indicates, whether the associated data time slot has been reserved in a subsequent time frame for transmission of the next data packet by the transmitting station, the associated data time slot in the subsequent time frame representing the data transmission resource, and wherein not hearing a reservation indicator in an indicator time slot indicates to the second transmitting station that the associated data time slot in the subsequent time frame can be used by the second transmitting station for transmitting a data packet.

11. A receiving station for use in a communications network comprising a plurality of transmitting stations and receiving stations for transmitting and receiving signals, comprising:

receiving means for receiving a data packet of a series of data packets of a data signal from a first transmitting station, via a transmission resource, and transmitting means for transmitting a reservation indicator for reception by a first transmitting station, in response to a reception without unacceptable interference of a first data packet from the first transmitting station by the receiving means, the reservation indicator indicating that a data transmission resource has been reserved by the receiving station for reception of the next data packet of the data signal from the first transmitting station transmitting the data signal;

wherein the receiving station is adapted to not transmit the reservation indicator, when the last data packet transmitted by the first transmitting station has not been received with acceptable interference by the receiving means, wherein each data packet is transmitted in a fixed data time slot of a plurality of data time slots within a time frame of a series of subsequent frames, wherein an indicator time slot is assigned to each data time slot of each frame, and wherein the reservation indicator transmitted by the receiving station in an indicator time slot indicates, whether the associated data time slot has been reserved in a subsequent time frame for transmission of the next data packet by the first transmitting station, the associated data time slot in the subsequent time frame representing the data transmission resource, and wherein not hearing a reservation indicator in an indicator time slot indicates to a second transmitting station that the associated data time slot in the subsequent time frame can be used by the second transmitting station for transmitting a data packet.

12. A transmitting station for use in a communications network comprising a plurality of transmitting stations and receiving stations for transmitting and receiving signals, comprising:

transmitting means for transmitting a data packet of a series of data packets of a data signal to a receiving station using a transmission resource, receiving means for receiving a reservation indicator transmitted from the receiving station, the reservation indicator indicating to the transmitting station that the receiving station has received the first data packet without unacceptable interference, wherein the transmitting means is adapted to transmit a next data packet of the series of data packets using the available transmission resource, when the reservation indicator is received by the receiving means, and wherein the transmitting means is adapted to not transmit a next data packet of the series of data packets using the transmission resource, when the next data packet is not received by the receiving means, wherein each data packet is transmitted in a fixed data time slot of a plurality of data time slots within a time frame of a series of subsequent frames, wherein an indicator time slot is assigned to each data time slot of each frame, and wherein the reservation indicator transmitted by the receiving station in an indicator time slot indicates, whether the associated data time slot has been reserved in a subsequent time frame for transmission of the next data packet by the transmitting station, the associated data time slot in the subsequent time frame representing the data transmission resource, and wherein not hearing a reservation indicator in an indicator time slot indicates to a further second transmitting station that the associated data time slot in the subsequent time frame can be used by the further transmitting station for transmitting a data packet.

13. A transmitting station for use in a communications network comprising a plurality of transmitting stations and receiving stations for transmitting and receiving signals, comprising:

transmitting means for intending to transmit a data packet of a series of data packets of a data signal to a receiving station using a transmission resource, receiving means for hearing, whether a reservation indicator assigned to the transmission resource is received, the reservation indicator indicating to the transmitting station that a receiving station has received a data packet without unacceptable interference from a different transmitting station, so that the data transmission resource is not allowed to be used by the transmitting station for a transmission of a data packet, wherein the transmitting means is adapted to use the transmission resource, when the reservation indicator is not heard by the receiving means, wherein each data packet is transmitted in a fixed data time slot of a plurality of data time slots within a time frame of a series of subsequent frames, wherein an indicator time slot is assigned to each data time slot of each frame, and wherein a reservation indicator transmitted by the receiving station in an indicator time slot indicates, whether the associated data time slot has been reserved in a subsequent time frame for transmission of the next data packet by a different transmitting station, the associated data time slot in the subsequent time frame representing the data transmission resource, and wherein not hearing a reservation indicator in an indicator time slot indicates to the transmitting station that the associated data time slot in the subsequent time frame can be used by the transmitting station for transmitting a data packet.

14. A method of operating a receiving station, comprising:

receiving a data packet of a series of data packets of a data signal from a first transmitting station, via a transmission resource;

transmitting a reservation indicator for reception by the first transmitting station, in response to a reception without unacceptable interference of a first data packet from the first transmitting station, the reservation indicator indicating that a data transmission resource has been reserved by the receiving station for reception of the next data packet of the data signal from the first transmitting station transmitting the data signal, wherein the reservation indicator is not transmitted, when the last data packet transmitted by the first transmitting station has not been received with acceptable interference in the step of receiving, wherein each data packet is transmitted in a fixed data time slot of a plurality of data time slots within a time frame of a series of subsequent frames, wherein an indicator time slot is assigned to each data time slot of each frame, and wherein the reservation indicator transmitted by the receiving station in an indicator time slot indicates, whether the associated data time slot has been reserved in a subsequent time frame for transmission of the next data packet by the first transmitting station, the associated data time slot in the subsequent time frame representing the data transmission resource, and wherein not hearing a reservation indicator in an indicator time slot indicates to a second transmitting station that the associated data time slot in the subsequent time frame can be used by the second transmitting station for transmitting a data packet.

15. A method of operating a transmitting station, comprising:
transmitting a data packet of a series of data packets of a data signal to a receiving station using a transmission resource,
receiving a reservation indicator transmitted from the receiving station, the reservation indicator indicating to the first transmitting station that the receiving station has received the first data packet without unacceptable interference;
transmitting a next data packet of the series of data packets using the available transmission resource, when the reservation indicator is received in the step of receiving, and
wherein a next data packet of the series of data packets is not transmitted using the transmission resource, when the next data packet is not received in the step of receiving,
wherein each data packet is transmitted in a fixed data time slot of a plurality of data time slots within a time frame of a series of subsequent frames,
wherein an indicator time slot is assigned to each data time slot of each frame, and
wherein the reservation indicator transmitted by the receiving station in an indicator time slot indicates, whether the associated data time slot has been reserved in a subsequent time frame for transmission of the next data packet by the transmitting station, the associated data time slot in the subsequent time frame representing the data transmission resource, and
wherein not hearing a reservation indicator in an indicator time slot indicates to a different transmitting station that the associated data time slot in the subsequent time frame can be used by the different transmitting station for transmitting a data packet.

16. A method of operating a transmitting station, comprising:
intending to transmit a data packet of a series of data packets of a data signal to a receiving station using a transmission resource,
hearing, whether a reservation indicator assigned to the transmission resource is received, the reservation indicator indicating to the transmitting station that a receiving station has received a data packet without unacceptable interference from a different transmitting station, wherein the data transmission resource is not allowed to be used by the transmitting station for a transmission of a data packet, when the reservation indicator is heard, and
using the transmission resource, when the reservation indicator is not heard in the step of hearing,
wherein each data packet is transmitted in a fixed data time slot of a plurality of data time slots within a time frame of a series of subsequent frames,
wherein an indicator time slot is assigned to each data time slot of each frame, and
wherein the reservation indicator transmitted by the receiving station in an indicator time slot indicates, whether the associated data time slot has been reserved in a subsequent time frame for transmission of the next data packet by a different transmitting station, the associated data time slot in the subsequent time frame representing the data transmission resource, and
wherein not hearing a reservation indicator in an indicator time slot indicates to the transmitting station that the associated data time slot in the subsequent time frame can be used by the transmitting station for transmitting a data packet.

17. A communications network comprising
a plurality of transmitting stations and receiving stations for transmitting and receiving signals, the transmitting stations being adapted for transmitting a data signal as a series of data packets, wherein a data packet is scheduled to be transmitted by a transmitting station by use of an available transmission resource, and the receiving stations being adapted for transmitting a reservation indicator for reception by transmitting stations,
wherein the reservation indicator transmitted by a receiving station in response to a reception without unacceptable interference of a first data packet from a first transmitting station indicates to the first transmitting station that the receiving station has received the first data packet without unacceptable interference, and indicates to a second transmitting station intending to transmit a data packet and also hearing the reservation indicator that a data transmission resource has been reserved by the receiving station for reception of the next data packet of a data signal from the first transmitting station transmitting the data signal and that the data transmission resource is not allowed to be used by the second transmitting station for a transmission of a data packet by the second transmitting station, and
wherein not hearing the reservation indicator by the second transmitting station indicates to the second transmitting station that a data transmission resource has not been reserved and can be used by the second transmitting station for transmitting the data packet or indicates to the first transmitting station that the last data packet transmitted by the first transmitting station has not been received with acceptable interference from the first receiving station,
wherein the data packets are transmitted in a fixed data sub-carrier of a plurality of data sub-carriers,
wherein an additional indicator sub-carrier is assigned to the data sub-carrier, and
wherein a reservation indicator transmitted by the receiving station in an indicator sub-carrier indicates, whether the associated data sub-carrier is reserved for transmission of the next data packet by the first transmitting station, the associated data sub-carrier representing the data transmission resource,
wherein not hearing a reservation indicator in an indicator sub-carrier indicates to the second transmitting station that the associated data sub-carrier can be used by the second transmitting station for transmitting a data packet.

18. A receiving station for use in a communications network comprising a plurality of transmitting stations and receiving stations for transmitting and receiving signals, comprising:
receiving means for receiving a data packet of a series of data packets of a data signal from a first transmitting station, via a transmission resource, and
transmitting means for transmitting a reservation indicator for reception by the first transmitting station, in response to a reception without unacceptable interference of a first data packet from the first transmitting station by the receiving means, the reservation indicator indicating that a data transmission resource has been reserved by the receiving station for reception of the next data packet of the data signal from the first transmitting station transmitting the data signal;

wherein the receiving station is adapted to not transmit the reservation indicator, when the last data packet transmitted by the first transmitting station has not been received with acceptable interference by the receiving means, wherein the data packets are transmitted in a fixed data sub-carrier of a plurality of data sub-carriers, wherein an additional indicator sub-carrier is assigned to the data sub-carrier, and wherein a reservation indicator transmitted by the receiving station in an indicator sub-carrier indicates, whether the associated data sub-carrier is reserved for transmission of the next data packet by the transmitting station, the associated data sub-carrier representing the data transmission resource, wherein not hearing a reservation indicator in an indicator sub-carrier indicates to a different transmitting station that the associated data sub-carrier can be used by the different transmitting station for transmitting a data packet.

19. A transmitting station for use in a communications network comprising a plurality of transmitting stations and receiving stations for transmitting and receiving signals, comprising:

transmitting means for transmitting a data packet of a series of data packets of a data signal to a receiving station using a transmission resource, receiving means for receiving a reservation indicator transmitted from the receiving station, the reservation indicator indicating to the transmitting station that the receiving station has received the first data packet without unacceptable interference, wherein the transmitting means is adapted to transmit a next data packet of the series of data packets using the available transmission resource, when the reservation indicator is received by the receiving means, and wherein the transmitting means is adapted to not transmit a next data packet of the series of data packets using the transmission resource, when the next data packet is not received by the receiving means, wherein the data packets are transmitted in a fixed data sub-carrier of a plurality of data sub-carriers, wherein an additional indicator sub-carrier is assigned to the data sub-carrier, and wherein a reservation indicator transmitted by the receiving station in an indicator sub-carrier indicates, whether the associated data sub-carrier is reserved for transmission of the next data packet by the transmitting station, the associated data sub-carrier representing the data transmission resource, wherein not hearing a reservation indicator in an indicator sub-carrier indicates to a different transmitting station that the associated data sub-carrier can be used by the different transmitting station for transmitting a data packet.

20. A transmitting station for use in a communications network comprising a plurality of transmitting stations and receiving stations for transmitting and receiving signals, comprising:

transmitting means for intending to transmit a data packet of a series of data packets of a data signal to a receiving station using a transmission resource, receiving means for hearing, whether a reservation indicator assigned to the transmission resource is received, the reservation indicator indicating to the transmitting station that a receiving station has received a data packet without unacceptable interference from a different transmitting station, so that the data transmission resource is not allowed to be used by the transmitting station for a transmission of a data packet, wherein the transmitting means is adapted to use the transmission resource, when the reservation indicator is not heard by the receiving means, wherein the data packets are transmitted in a fixed data sub-carrier of a plurality of data sub-carriers, wherein an additional indicator sub-carrier is assigned to the data sub-carrier, and wherein a reservation indicator transmitted by the receiving station in an indicator sub-carrier indicates, whether the associated data sub-carrier is reserved for transmission of the next data packet by a further transmitting station, the associated data sub-carrier representing the data transmission resource, wherein not hearing a reservation indicator in an indicator sub-carrier indicates to the transmitting station that the associated data sub-carrier can be used by the transmitting station for transmitting a data packet.

* * * * *